US008699389B2

(12) United States Patent
Ogura

(10) Patent No.: US 8,699,389 B2
(45) Date of Patent: Apr. 15, 2014

(54) ACCESS POINT AND TERMINAL DEVICE

(75) Inventor: Kanae Ogura, Kakamigahara (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 276 days.

(21) Appl. No.: 13/234,750

(22) Filed: Sep. 16, 2011

(65) Prior Publication Data
US 2012/0076069 A1 Mar. 29, 2012

(30) Foreign Application Priority Data
Sep. 24, 2010 (JP) ................................ 2010-213470

(51) Int. Cl.
*H04B 7/00* (2006.01)
*H04W 60/04* (2009.01)

(52) U.S. Cl.
CPC .................................. *H04W 60/04* (2013.01)
USPC ........................................................ 370/310

(58) Field of Classification Search
CPC .................................................... H04W 60/00
USPC ................. 370/310, 315, 328–330, 431, 432; 709/223–225, 227, 228, 246
See application file for complete search history.

(56) References Cited

U.S. PATENT DOCUMENTS

| | | | | |
|---|---|---|---|---|
| 8,184,602 | B2* | 5/2012 | Aaltonen et al. | 370/338 |
| 8,588,133 | B2* | 11/2013 | Kouda et al. | 370/328 |
| 2004/0229606 | A1* | 11/2004 | Oshima et al. | 455/426.2 |
| 2006/0123122 | A1* | 6/2006 | Jung et al. | 709/227 |
| 2007/0143391 | A1* | 6/2007 | Nakamura | 709/200 |
| 2007/0168572 | A1* | 7/2007 | Miyazawa | 710/8 |
| 2008/0026724 | A1* | 1/2008 | Zhang | 455/411 |
| 2010/0067436 | A1 | 3/2010 | Kouda et al. | |

FOREIGN PATENT DOCUMENTS

| | | |
|---|---|---|
| JP | 11-188934 A | 7/1999 |
| JP | 2002-344646 A | 11/2002 |
| JP | 2005-43721 A | 2/2005 |
| JP | 2006-345150 A | 12/2006 |
| JP | 2007-318432 A | 12/2007 |
| JP | 2008-252809 A | 10/2008 |
| JP | 2010-74554 A | 4/2010 |

OTHER PUBLICATIONS

Notification of Reasons for Refusal dated Jul. 30, 2013 from related Japanese Patent Application No. 2010-213470, together with an English language translation.

* cited by examiner

*Primary Examiner* — Dmitry H Levitan
(74) *Attorney, Agent, or Firm* — Scully, Scott, Murphy & Presser, PC

(57) ABSTRACT

An access point configured to relay communications of a terminal device in a wireless network, the access point including: a request receiving unit, which receives a setting change request to change a first wireless setting, which is being set as a wireless setting of the wireless network, into a second wireless setting; a determination unit, which determines whether a second terminal device, which performs communications with the access point in accordance with the first wireless setting, is present; and a setting change unit; wherein when it is determined that the second terminal device is not present in the wireless network, the setting change unit changes from the first wireless setting to the second wireless setting in response to the setting change request, and wherein when it is determined that the second terminal device is present in the wireless network, the setting change unit keeps the first wireless setting.

6 Claims, 5 Drawing Sheets

WHEN ANOTHER TERMINAL DEVICE IS NOT PRESENT, THE SETTING CAN BE CHANGED

WHEN ANOTHER DEVICE IS PRESENT, THE SETTING CANNOT BE CHANGED

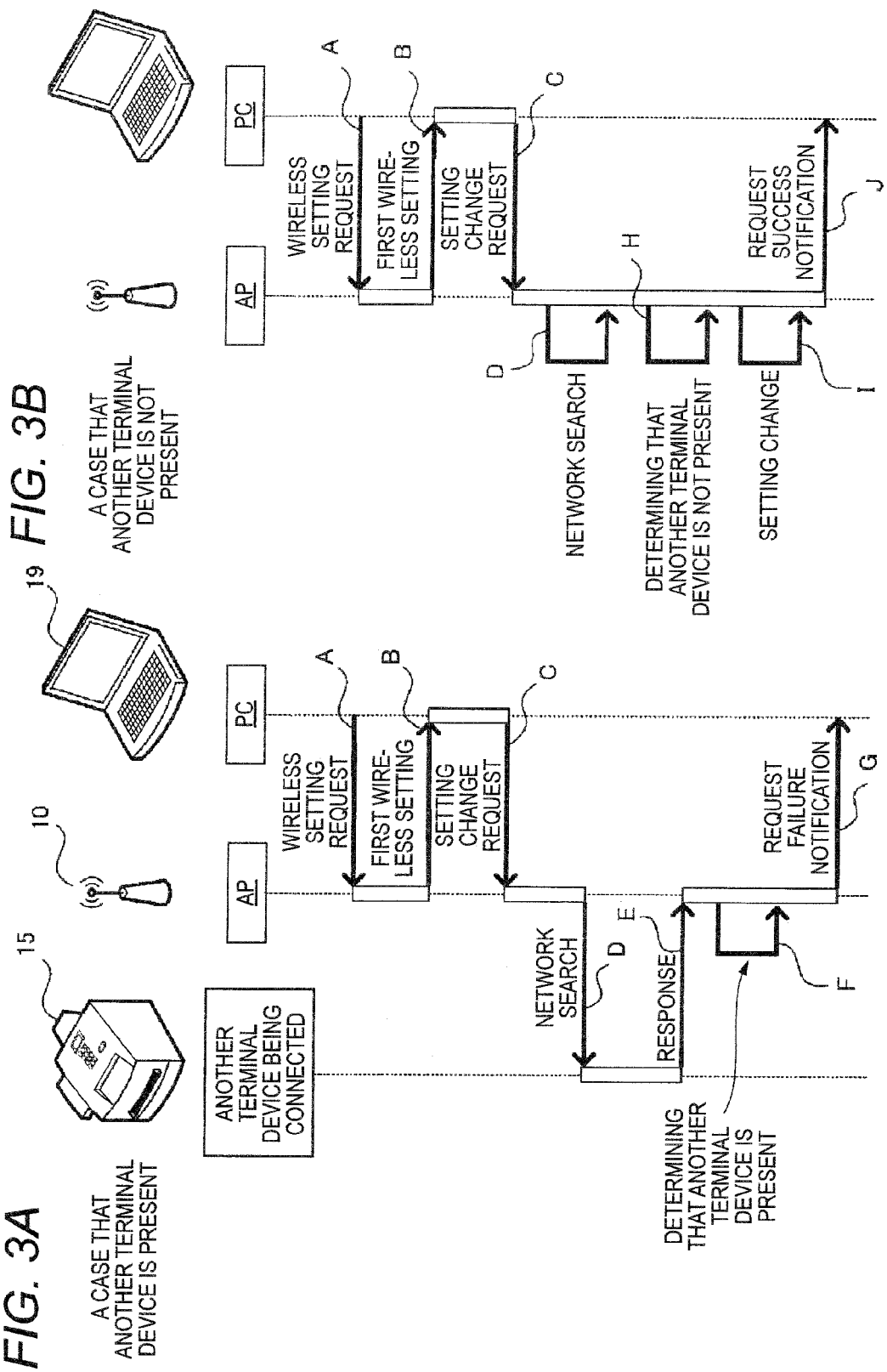

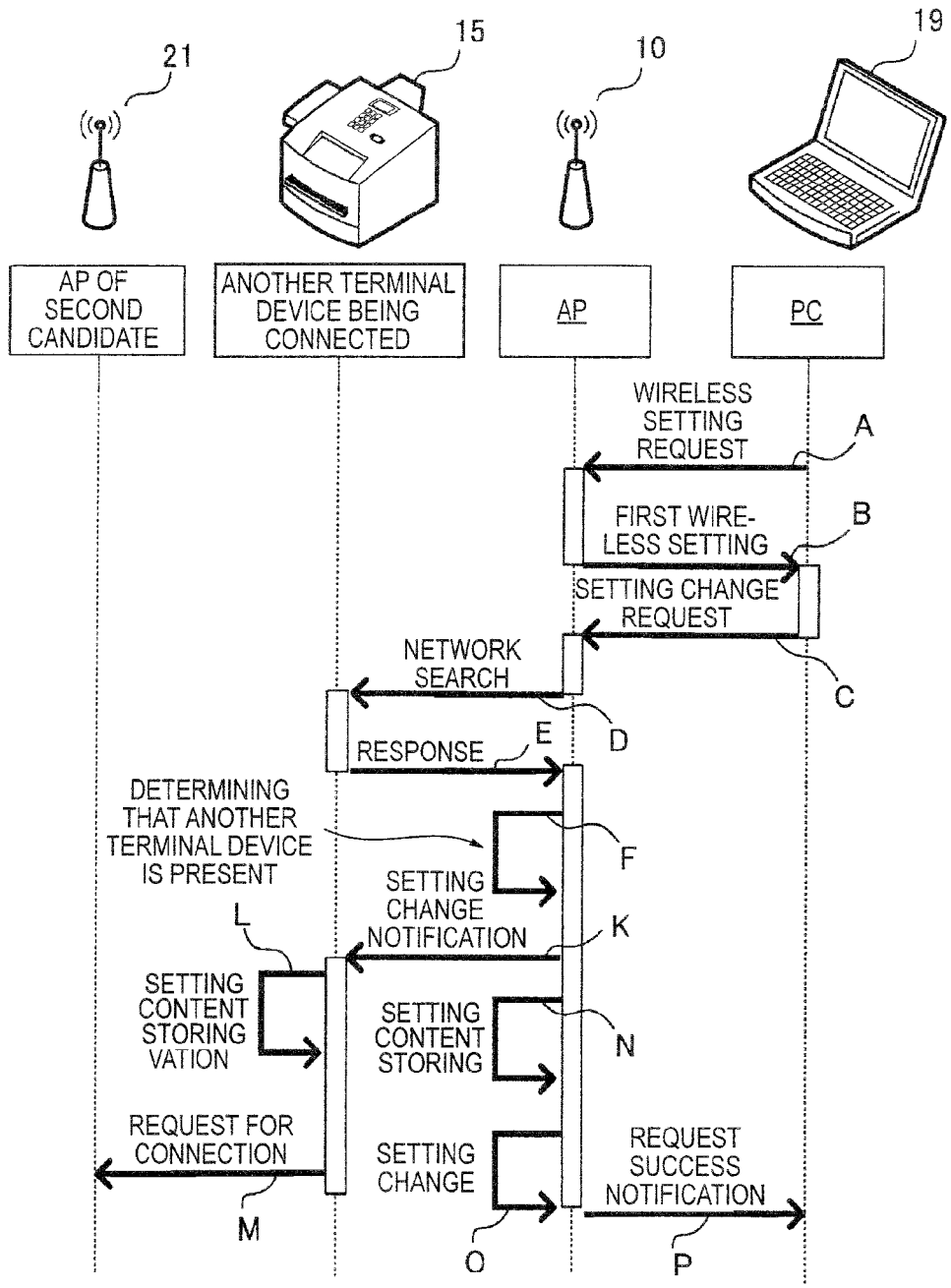

ACCESS POINT AND TERMINAL DEVICE

CROSS-REFERENCE TO RELATED APPLICATION

This application claims priority from Japanese Patent Application No. 2010-213470 filed on Sep. 24, 2010, the entire subject matter of which is incorporated herein by reference.

BACKGROUND

The present invention relates to an access point that can relay communications of a terminal device in a wireless network, a terminal device in the wireless network whose communications can be relayed by the access point and a program to control the access point to relay the communications of the terminal device in the wireless network.

A technology has been known which sets a password to limit a setting-changeable case.

For example, according to the technology disclosed in related arts, user authentication is performed before a setting is changed. Only when a password is consistent, the setting can be changed. When a password is not consistent, it is considered that another person tries to change the setting, so that a mode is shifted to a setting operation prohibition mode.

SUMMARY

In many cases, a user erroneously changes a wireless setting. For example, generally, the wireless setting is cumbersome and difficult, so that a user may unintentionally change the wireless setting due to an erroneous operation or a user may newly establish a wireless network because the user does not know the existing wireless network. When the wireless setting is erroneously changed, the communications of a terminal device in the wireless network may be disconnected.

On the other hand, the related arts only controls whether to permit the setting change depending on whether the password is input or not, so that the user may erroneously change the wireless setting. Accordingly, the technology cannot solve the above problem.

In addition, not only when the wireless setting is erroneously changed as described above but also when the user intentionally changes the wireless setting of the existing wireless network, the communications of the terminal device that currently performs the communications in the wireless network is to be disconnected.

Accordingly, an present invention is provide a technology capable of suppressing a terminal device in a wireless network from being disconnected when a request for change of a wireless setting is made.

In view of the above, an access point of one illustrative aspect of the present invention is configured to relay communications of a terminal device in a wireless network, the access point comprising: a request receiving unit, which receives a setting change request to change a first wireless setting, which is being set as a wireless setting of the wireless network, into a second wireless setting, from a first terminal device; a determination unit, which determines whether a second terminal device, which is different from the first terminal device and performs communications with the access point in accordance with the first wireless setting, is present in the wireless network; and a setting change unit; wherein when it is determined that the second terminal device is not present in the wireless network, the setting change unit changes from the first wireless setting to the second wireless setting in response to the setting change request, and wherein when it is determined that the second terminal device is present in the wireless network, the setting change unit keeps the first wireless setting without changing the first wireless setting into the second wireless setting in response to the setting change request.

When it is determined that the second terminal device is not present in the wireless network, even though the first wireless setting is changed into the second wireless setting, it does not influence the second terminal device. Accordingly, the first wireless setting is changed into the second wireless setting. On the other hand, when it is determined that the second terminal device is present in the wireless network, if the first wireless setting is changed into the second wireless setting, it influences the second terminal device. Accordingly, the first wireless setting is not changed. Like this, when the setting change request is made, it is controlled whether the first wireless setting is changed depending, on the situation of the wireless network. Thereby, it is possible to suppress the terminal device in the wireless network from being disconnected.

Additionally, the first terminal device may be a terminal device that is present in the wireless network or that is not present in the wireless network (for example, a terminal device that is wire-connected to an access point).

Further, an access point of another illustrative aspect of the present invention is configured to relay communications of a terminal device in a wireless network, the access point comprising: a request receiving unit, which receives a setting change request to change a first wireless setting, which is being set as a wireless setting of the wireless network, into a second wireless setting, from a first terminal device; a determination unit, which determines whether a second terminal device, which is different from the first terminal device and performs communications with the access point in accordance with the first wireless setting, is present in the wireless network; a notification unit, which notifies the second terminal device that the first wireless setting is to be changed, when it is determined that the second terminal device is present in the wireless network; and a setting change unit, which changes the first wireless setting into the second wireless setting in response to the setting change request, wherein when it is determined that the second terminal device is present in the wireless network, the setting change unit changes the first wireless setting into the second wireless setting after the notification by the notification unit.

When it is determined that the second terminal device is not present in the wireless network, even though the first wireless setting is changed into the second wireless setting, it does not influence the second terminal device. Accordingly, the first wireless setting is changed into the second wireless setting. On the other hand, when it is determined that the second terminal device is present in the wireless network, if the first wireless setting is changed into the second wireless setting, it influences the second terminal device. Accordingly, after the second terminal device is notified that the first wireless setting is to be changed, the first wireless setting is changed into the second wireless setting. Thereby, even when the second terminal device is present in the wireless network, the second terminal device can recognize that the first wireless setting is to be changed, so that it can perform a process to keep the communications in response to the notification. In other words, it is possible to suppress the terminal device in the wireless network from being disconnected.

Additionally, the first terminal device may be a terminal device that is present in the wireless network but does not exist in the wireless network (for example, a terminal device that is wire-connected to an access point).

Further, a terminal device of another illustrative aspect of the present invention is present at a specific address of addresses indicating terminal devices in the wireless network, the terminal device comprising: an inquiry receiving unit, which receives an inquiry whether a terminal device is present at the specific address from the access point; a response unit, which transmits a response to the access point in response to the inquiry; a notification receiving unit, which receives a notification transmitted by the access point in response to the response and indicates that a first wireless setting is to be changed, and a connection trying unit, which tries to connect to another access point that is different from the access point when the notification receiving unit receives the notification.

Thereby, when the second terminal device is present in the wireless network, the second terminal device tries to connect to another access point in accordance with the notification. Accordingly, it is possible to suppress the second terminal device from being disconnected.

Further, in another aspect of the present invention, a non-transitory computer-readable medium having instructions to control an access point to perform a method of relay communications of a terminal device in a wireless network, the method comprises: receiving a setting change request to change a first wireless setting, which is being set as a wireless setting of the wireless network, into a second wireless setting, from a first terminal device; determining whether a second terminal device, which is different from the first terminal device and performs communications with the access point in accordance with the first wireless setting, is present in the wireless network; changing from the first wireless setting to the second wireless setting in response to the setting change request when it is determined that the second terminal device is not present in the wireless network; and keeping the first wireless setting without changing the first wireless setting into the second wireless setting in response to the setting change request when it is determined that the second terminal device is present in the wireless network.

Thereby, the access point having the program can suppress the terminal device in the wireless network from being disconnected.

Further, in another aspect of the present invention, a non-transitory computer-readable medium having instructions to control an access point to perform a method of relay communications of a terminal device in a wireless network, the method comprising: receiving a setting change request to change a first wireless setting, which is being set as a wireless setting of the wireless network, into a second wireless setting, from a first terminal device; determining whether a second terminal device, which is different from the first terminal device and performs communications with the access point in accordance with the first wireless setting, is present in the wireless network; notifying the second terminal device that the first wireless setting is to be changed, when it is determined that the second terminal device is present in the wireless network; and changing the first wireless setting into the second wireless setting in response to the setting change request, changing the first wireless setting into the second wireless setting after the notification when it is determined that the second terminal device is present in the wireless network.

Thereby, the access point having the program can suppress the terminal device in the wireless network from being disconnected.

According to the present invention, when a changing request of a wireless setting is made, the access point can suppress the terminal device in the wireless network from being disconnected.

BRIEF DESCRIPTION OF THE DRAWINGS

FIGS. 3A and 3B are sequence views illustrating processes that the access point and each terminal device execute in the first illustrative embodiment;

FIG. 5 is a sequence view illustrating processes that the access point and each terminal device execute in the second illustrative embodiment.

DETAILED DESCRIPTION OF THE PRESENT INVENTION

Hereinafter, illustrative embodiments of the present invention will be described with reference to the drawings.

A. First Illustrative Embodiment (A-1. Outline of First Illustrative Embodiment)

Figure 1B:
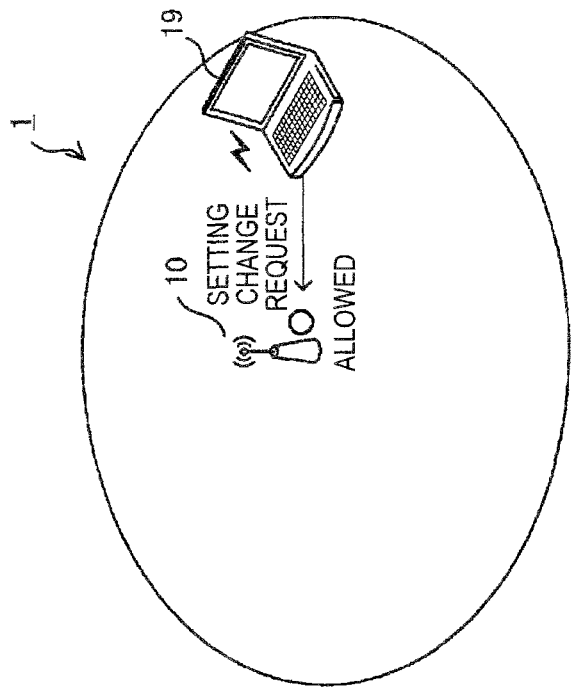
FIGS. 1A and 1B are views illustrating an outline of a first illustrative embodiment.

An outline of a first illustrative embodiment will be described with reference to FIG. 1.

Figure 1A:
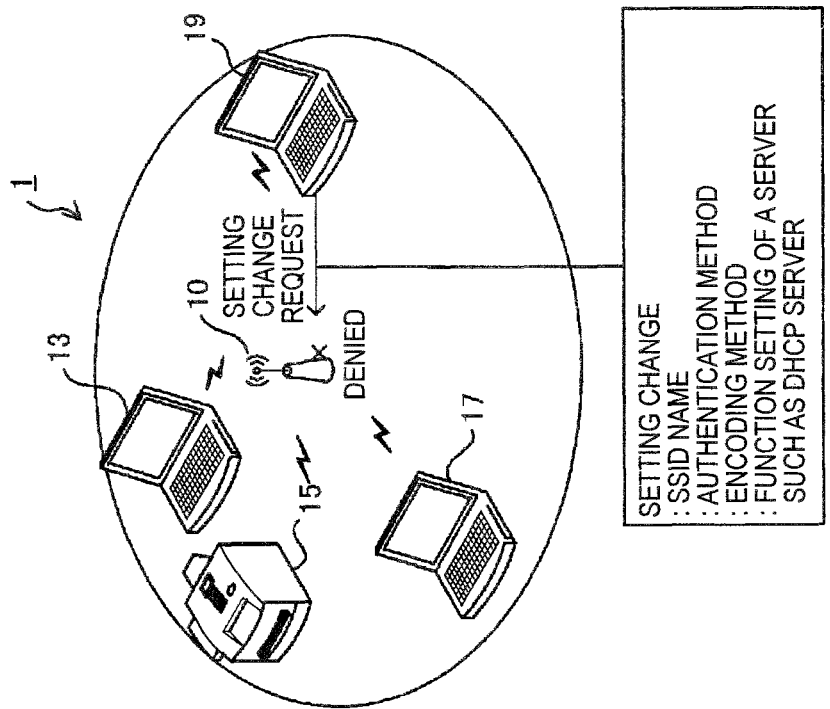

As shown in FIG. 1A, an access point 10 relays communications between a PC 13, a printer 15, a PC 17 and a PC 19, which are in a wireless network 1.

Here, it is assumed that the PC 19 transmits a setting change request to the access point 10 due to a user's erroneous operation. Then, the access point 10 determines whether another terminal device is present in the wireless network 1.

When it is determined that another terminal device is present in the wireless network 1, the access point 10 denies the setting change request (as shown in FIG. 1A). On the other hand, when it is determined that another terminal device is not present in the wireless network 1, the access point 10 changes a wireless setting according to the setting change request (refer to FIG. 1B).

(A-2. Configuration of Access Point 10)

Figure 2B:
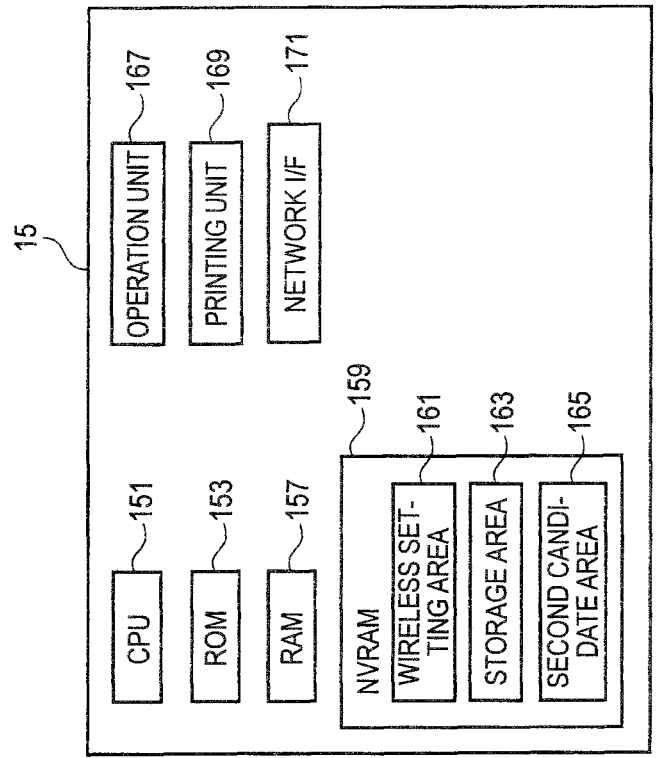
FIG. 2B is a view a block diagram illustrating configurations of a terminal device.
Figure 2A:
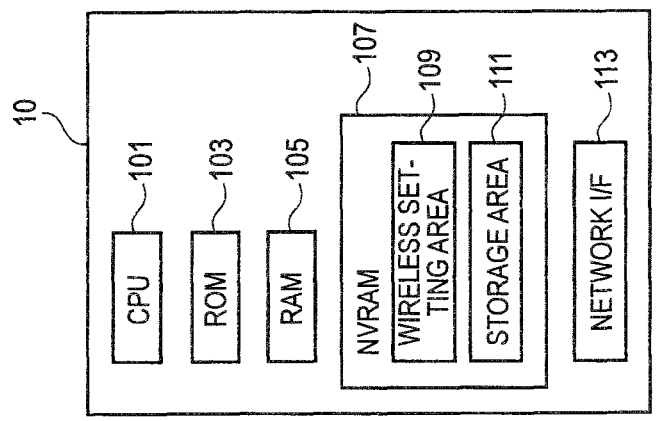
FIG. 2A is a view a block diagram illustrating configurations of an access point.

A configuration of the access point 10 is described with reference to FIG. 2A.

The access point 10 includes a CPU 101, a ROM 103, a RAM 105, an NVRAM 107 and a network I/F 113.

The CPU 101 generally controls all configurations of the access point 10.

The ROM 103 stores programs by which the access point 10 performs various processes. The CPU 101 performs processes described below, based on the programs stored in the ROM 103.

The RAM 105 is used as a storage area that stores data, which is created when the CPU 101 performs the various processes, and the RAM 105 is also used as a storage area when the CPU 101 performs the various processes.

The NVRAM 107 has a wireless setting area 109 and a storage area 111.

The wireless setting area 109 stores a wireless setting that is being set in the access point 10.

The storage area 111 stores the wireless setting that is being set in the access point 10, when the access point 10 changes the wireless setting into a new setting. The details of storing processes will be described in a second illustrative embodiment.

The network I/F 113 is an interface connecting the access point 10 to the wireless network 1.

(A-3. Configuration of Printer 15)

The printer 15 that is one example of a configuration of another terminal device will be described with reference to FIG. 2B. The printer 15 is present in the wireless network 1 and different from a terminal device (PC 19) that has transmitted the setting change request.

In the meantime, the PC 13 and the PC 17 also have the same configurations as the printer 15, except for a printing unit.

The printer 15 includes a CPU 151, a ROM 153, a RAM 157, an NVRAM 159, an operation unit 167 and a printing unit 169.

The CPU 151 generally controls all configurations of the printer 15.

The ROM 153 stores programs (for example, program for printing process) by which the printer 15 performs various processes. The CPU 151 performs processes described below based on the programs stored in the ROM 153.

The RAM 157 is used as a storage area that stores data, which is created when the CPU 151 performs the various processes, and the RAM 157 is also used as a storage area when the CPU 151 performs the various processes.

The NVRAM 159 has a wireless setting area 161, a storage area 163 and a second candidate area 165.

The wireless setting area 161 stores a wireless setting that is being set in the printer 15.

The storage area 163 stores a wireless setting that is being set in the printer 15 when the printer 15 receives a setting change notification (which will be described later) from the access point 10. The details of storing processes will be described in a second illustrative embodiment.

The second candidate area 165 stores a wireless setting by which the printer 15 makes a connection request to an second candidate access point 21, i.e., a wireless setting of an second candidate access point 21. The details of storing processes will be described in a second illustrative embodiment.

The operation unit 167 has operation keys. A user can operate the operation unit 167, thereby enabling the printer 15 to execute various processes (for example, copying process).

The printing unit 167 executes a printing process in response to a printing instruction.

A network I/F 171 is an interface to connect the printer 15 to the wireless network 1.

(A-4. Processes that are Executed by the Access Point 10 and Each Terminal Device)

The processes that are executed by each terminal device are described with reference to FIG. 3.

With reference to the FIG. 3A, it will be described that a case that a terminal device (PC 19) that has transmitted a setting change request and another terminal device (hereinafter, referred to as another terminal device) are present in the wireless network 1. Although the printer 15 is exemplified as another terminal device, the PC 13 and the PC 17 also performs the same process.

The PC 19 transmits a wireless setting request indicating a request for wireless setting being set in the wireless network 1 (hereinafter, referred to as first wireless setting), to the access point 10, and then the access point 10 receives the wireless setting request from the PC 19 (process A in FIG. 3A).

The access point 10 transmits the first wireless setting to the PC 19, and then the PC 19 receives the first wireless setting from the access point 10 (process B in FIG. 3A).

Continuously, the PC 19 transmits a setting change request, which requests a change from the first wireless setting into a second wireless setting, (hereinafter, referred to as the setting change request), to the access point 10, and then the access point 10 receives the setting change request from the PC 19 (process C in FIG. 3A).

The access point 10 searches whether another terminal device in addition to the PC 19 is present in the wireless network 1. Specifically, the access point 10 broadcast to a broadcast address corresponding to the wireless network 1, and then the printer 15 receives the broadcast from the access point 10 (process D in FIG. 3A).

Continuously, the printer 15 transmits a response (hereinafter, referred to as response) indicating that the oneself (printer 15) is present in the wireless network 1 to the access point 10 in response to the broadcast, and then the access point 10 receives the response from the printer 15 (process E in FIG. 3A).

Then, the access point 10 determines whether the received response is transmitted from another terminal device, thereby determining whether another terminal device is present in the wireless network 1.

More specifically, the access point 10 stores an IP address of the PC 19. The access point 10 determines whether there is an IP address of the terminal device, which transmits the response to the broadcast, except for the IP address of the PC 19. When there is an IP address of a terminal device that transmits the response except for the IP address of the PC 19, the access point 10 determines that another terminal device is present in the wireless network 1. On the other hand, when there is only the IP address of the PC 19 that transmits the response, the access point 10 determines that another terminal device is not present in the wireless network 1.

Here, since the printer 15 has made a response to the broadcast, the access point 10 determines that another terminal device is present in the wireless terminal device 1 (process F in FIG. 3A).

When the access point 10 determines that another terminal device is present in the wireless terminal device 1, the access point transmits a request failure notification to the PC 19 without changing the wireless setting, and then the PC 19 receives the request failure notification from the access point 10 (process G in FIG. 3).

Next, with reference to FIG. 3B, it will be described a case that another terminal device is not present in the wireless network 1. Since the processes of A to D in FIG. 3B are the same as FIG. 3A, the detailed descriptions thereof will be omitted.

The access point 10 broadcasts to the broadcast address corresponding to the wireless network 1 (process D). Then, the access point 10 receives a response from the PC 19, and but the access point 10 does not receive a response from another terminal device.

Accordingly, the access point 10 determines that another terminal device is not present in the wireless network 1 (process H in FIG. 3B).

When the access point 10 determines that another terminal device is not present in the wireless network 1, the access point 10 changes from the first wireless setting into the second wireless setting in response to the setting change request (process I in FIG. 3B). More specifically, the access point 10 erases the first wireless setting stored in the wireless setting area 109 of the NVRAM 107 and stores the second wireless setting in the wireless setting area 109.

After that, the access point 10 transmits a request success notification to the PC 19, and then the PC 19 receives the request success notification from the access point 10 (process J in FIG. 3B).

Accordingly, the access point 10 determines whether another terminal device is present in the wireless network 1, thereby controlling whether to change the current wireless setting. In other words, the access point 10 determines the situation of the wireless network 1, thereby determining whether the setting change request from the PC 19 is a suitable request. When another terminal device is present in the wireless network 1, the access point 10 determines that the setting change request is an erroneous request and keeps the current wireless setting. On the other hand, when another terminal device is not present in the wireless network 1, the access point 10 determines that the setting change request is a suitable request and changes the current wireless setting to a new wireless setting.

Thereby, even when a user of a terminal device in the wireless network 1 transmits the setting change request to the access point 10 due to an erroneous operation, it is possible to keep the communications of the wireless network 1.

B. Second Illustrative Embodiment (B-1. Outline of Second Illustrative Embodiment)

Figure 4:
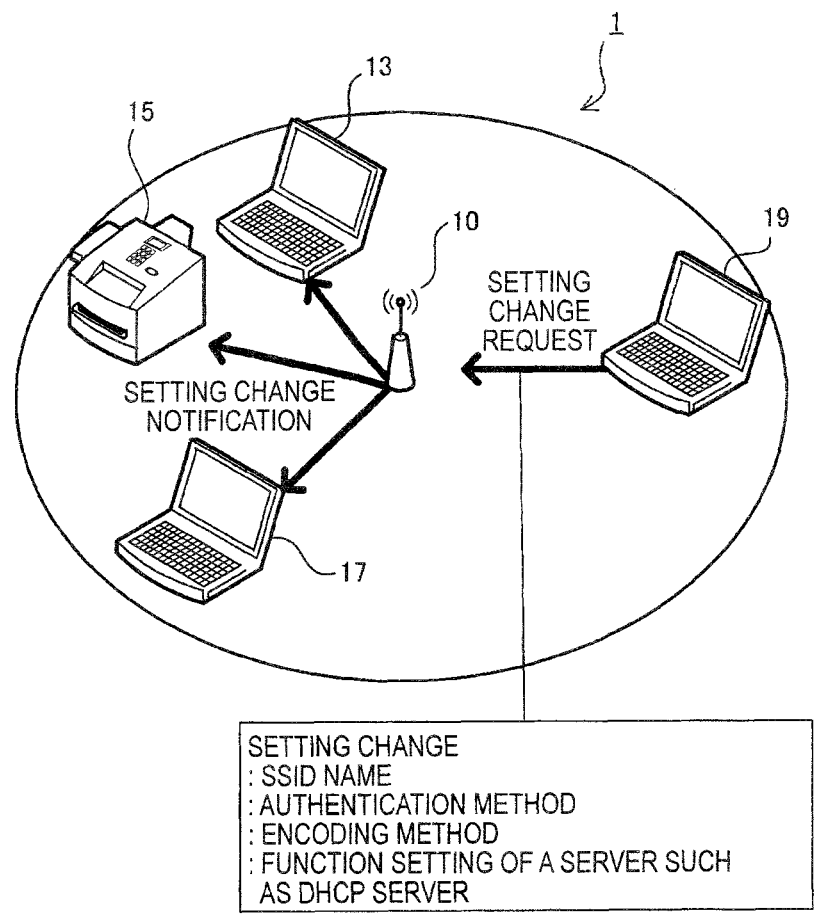
FIG. 4 is a view illustrating an outline of a second illustrative embodiment.

An outline of a second illustrative embodiment will be is described with reference to FIG. 4.

The second illustrative embodiment is the same as the first illustrative embodiment with respect to the processes in case that another terminal device is not present in the wireless network. Accordingly, only a case that another terminal device is present in the wireless network 1 will be described.

When the access point 10 receives the setting change request from the PC 19, the access point determines whether another terminal device is present in the wireless network 1. When the access point determines that another terminal device is present in the wireless network 1, the access point transmits a setting change notification indicating that the wireless setting is to be changed, to another terminal device.

After transmitting the setting change notification to another terminal device, the access point 10 changes the wireless setting.

(B-2. Processes that are Executed by the Access Point 10 and Each Terminal Device)

The processes that are executed by the access point 10 and each terminal device are described with reference to FIG. 5. Also in the second illustrative embodiment, the printer 15 is exemplified as another terminal device.

Since the processes of A to F shown in FIG. 5 are the same as those of FIG. 3A, the detailed descriptions thereof will be omitted.

When the access point 10 determines that another terminal device is present in the wireless network 1 (process F), the access point 10 transmits a setting change notification indicating that the first wireless setting is to be changed (hereinafter, referred to as setting change notification), to the printer 15, and then the printer 15 receives the setting change notification from the access point 10 (process K in FIG. 5).

Then, the printer 15 stores the first wireless setting (process L in FIG. 5). More specifically, the printer 15 stores the first wireless setting in the storage area 163 of the NVRAM 159, and then the printer 15 erases the first wireless setting stored in the wireless setting area 161 of the NVRAM 159. However, since the printer 15 stores the first wireless setting, the printer 15 can return the wireless setting to the wireless setting before the change, so that the printer 15 can again perform the communications by the wireless setting before the change.

Continuously, the printer 15 reads out the wireless setting of the second candidate access point 21, which is stored in the second candidate area 165 of the NVRAM 159, and stores the same in the wireless setting area 161 as a new wireless setting, thereby transmitting a connection request to the second candidate access point 21 (process M in FIG. 5).

In the meantime, when the access point 10 transmits the setting change notification to the printer 15, it stores the first wireless setting (process N in FIG. 5). More specifically, the access point 10 stores the first wireless setting in the storage area 111 of the NVRAM 107, and then the access point 10 erases the first wireless setting stored in the wireless setting area 109 of the NVRAM 107. However, since the access point 10 stores the first wireless setting, access point 10 can return the wireless setting to the wireless setting before the change, so that access point 10 can again perform the communications by the wireless setting before the change.

The access point 10 changes from the first wireless setting into the second wireless setting in response to the setting change request (process O in FIG. 5). More specifically, the access point 10 stores the second wireless setting in the wireless setting area 109 of the NVRAM 107.

Continuously, the access point 10 transmits a request success notification to the PC 19, and then the PC 19 receives the request success notification from the access point 10 (process P in FIG. 5).

Like this, according to the second illustrative embodiment, when another terminal device is present in the wireless network 1, the setting change notification is transmitted to another terminal device, and another terminal device requests to connect to the second candidate access point 21. Thereby, another communications is prevented from being disconnected. According to the second illustrative embodiment, the PC 19 can change the wireless setting of the access point 10 into the second wireless setting. In other words, according to the first illustrative embodiment, the setting change request that is intentionally transmitted by the user of the PC 19 is denied because the request is considered as the setting change request due to the erroneous operation. However, according to the second illustrative embodiment, the request is not denied and the current configuration of the wireless network 1 can be changed.

In the above illustrative embodiments, the PC 19 (terminal device that that transmits the setting change request) corresponds to the "first terminal device", the printer 15 (another terminal device) corresponds to the "second terminal device", the process C that is performed by the CPU 101 corresponds to the "request receiving unit", the processes F and H that are performed by the CPU 101 correspond to the "determination unit", the process I or O that is performed by the CPU 101 corresponds to the "setting change unit", the process K that is performed by the CPU 101 corresponds to the "notification unit", the process L that is performed by the CPU 101 corresponds to the "first storage unit", the process D that is performed by the CPU 101 corresponds to the "inquiry unit", the process E that is performed by the CPU 101 corresponds to the "response receiving unit", the process D that is performed by the CPU 151 corresponds to the "inquiry receiving unit", the process E that is performed by the CPU 151 corresponds to the "response unit", the process K that is performed by the CPU 151 corresponds to the "notification receiving unit", the process M that is performed by the CPU 151 corresponds to the "connection trying unit" and the process L that is performed by the CPU 151 corresponds to the "second storage unit."

Modified Embodiments

Although the illustrative embodiments have been described, it should be noted that the invention is not limited to the illustrative embodiments and a variety of embodiments can be adopted within a scope without departing from the present invention.

For example, in the above illustrative embodiments, the PC 19 that transmits the setting change request to the access point 10 is a terminal device that is present in the wireless network 1. However, the invention is not limited thereto. In other words, the PC 19 may be a terminal device that is wire-connected to the access point and does not belong to the wireless network 1. In this case, since the PC 19 is not present in the broadcast address corresponding to the wireless network 1, the broadcast from the access point 10 is received by the PC 19. Accordingly, the access point 10 may determine whether the second terminal device is present in the wireless network 1 depending on whether there is a response to the broadcast.

In the above illustrative embodiments, the access point 10 broadcasts to determine whether the second terminal device is present in the wireless network 1. However, the invention is not limited thereto. For example, the access point 10 may occasionally store IP addresses of terminal devices that make a participation request to the wireless network 1. When receiving a setting change request, transmit a simple packet to a terminal device to determine whether a terminal device is present in the stored IP addresses depending on whether or not a response from the terminal device.

In the second illustrative embodiment, the printer 15 may store not only the wireless setting of the second candidate access point 21 but also wireless settings of third and more candidate access points and try to connect to another access point until a connection request is allowed.

What is claimed is:

1. An access point configured to relay communications of a terminal device in a wireless network, the access point comprising:
   a request receiving unit, which receives a setting change request to change a first wireless setting, which is being set as a wireless setting of the wireless network, into a second wireless setting, from a first terminal device;
   a determination unit, which determines whether a second terminal device, which is different from the first terminal device and performs communications with the access point in accordance with the first wireless setting, is present in the wireless network; and
   a setting change unit;
   wherein when it is determined that the second terminal device is not present in the wireless network, the setting change unit changes from the first wireless setting to the second wireless setting in response to the setting change request, and
   wherein when it is determined that the second terminal device is present in the wireless network, the setting change unit keeps the first wireless setting without changing the first wireless setting into the second wireless setting in response to the setting change request.

2. The access point according to claim 1, further comprising:
   an inquiry unit, which inquires whether a terminal device is present at a specific address of addresses indicating terminal devices in the wireless network; and
   a response receiving unit, which receives a response that is transmitted by the terminal device in response to the inquiry by the inquiry unit when the terminal device is present at the specific address,
   wherein the determination unit determines whether the second terminal device is present in the wireless network, based on the response that is received by the response receiving unit.

3. An access point configured to relay communications of a terminal device in a wireless network, the access point comprising:
   a request receiving unit, which receives a setting change request to change a first wireless setting, which is being set as a wireless setting of the wireless network, into a second wireless setting, from a first terminal device;
   a determination unit, which determines whether a second terminal device, which is different from the first terminal device and performs communications with the access point in accordance with the first wireless setting, is present in the wireless network;
   a notification unit, which sends a notification to the second terminal device that the first wireless setting is to be changed, so that the second terminal device tries to connect to another access point, in response to the determination that the second terminal device is present in the wireless network; and
   a setting change unit, which changes the first wireless setting into the second wireless setting in response to the setting change request,
   after the notification by the notification unit is sent to the second terminal device.

4. The access point according to claim 3, further comprising:
   a storage unit, which stores the first wireless setting when it is determined that the second terminal device is present in the wireless network,
   wherein when it is determined that the second terminal device is present in the wireless network, the setting change unit changes the first wireless setting to the second wireless setting after the storing by the storage unit.

5. A terminal device in a wireless network of which communications can be relayed by an access point, the terminal device present at a specific address of addresses indicating terminal devices in the wireless network, the terminal device comprising:
   an inquiry receiving unit, which receives an inquiry whether a terminal device is present at the specific address from the access point;
   a response unit, which transmits a response to the access point in response to the inquiry;
   a notification receiving unit, which receives a notification transmitted by the access point in response to the response and indicates that a first wireless setting is to be changed, and
   a connection trying unit, which tries to connect to another access point that is different from the access point when the notification receiving unit receives the notification.

6. The terminal device according to claim 5, further comprising:
   a storage unit, which stores the first wireless setting when the notification receiving unit receives the notification,
   wherein when the notification receiving unit receives the notification, the connection trying unit tries to connect to another access point after the storing by the storage unit.

* * * * *